Dec. 19, 1922.
C. A. JOACHIM ET AL.
DEFLECTOR.
FILED APR. 1, 1921.
1,439,001.
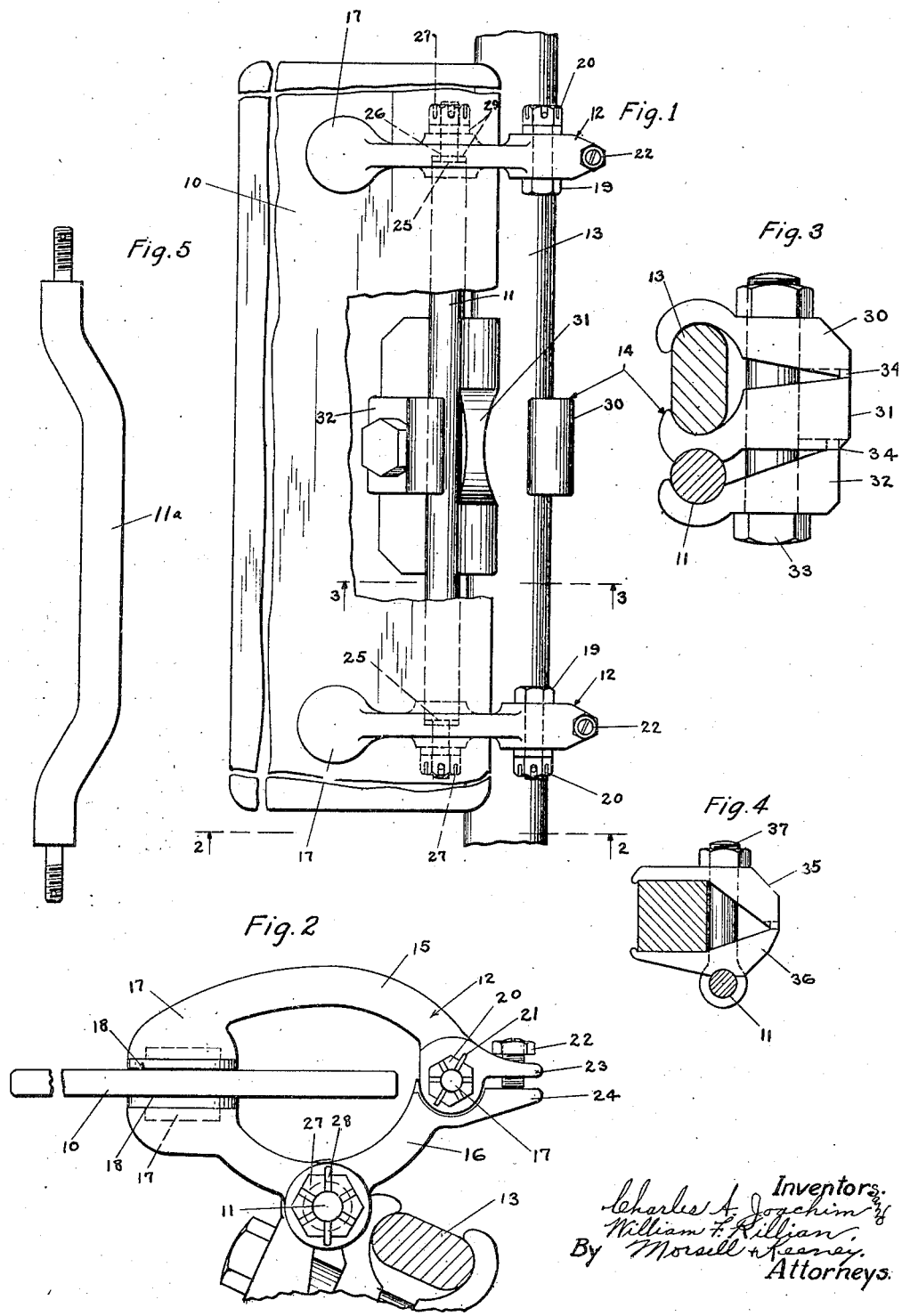

Patented Dec. 19, 1922.

1,439,001

UNITED STATES PATENT OFFICE.

CHARLES A. JOACHIM AND WILLIAM F. KILLIAN, OF OSHKOSH, WISCONSIN.

DEFLECTOR.

Application filed April 1, 1921. Serial No. 457,777.

*To all whom it may concern:*

Be it known that we, CHARLES A. JOACHIM and WILLIAM F. KILLIAN, citizens of the United States, and residents of Oshkosh, in the county of Winnebago and State of Wisconsin, have invented new and useful Improvements in Deflectors, of which the following is a description, reference being had to the accompanying drawings, which are a part of this specification.

Our invention relates to deflectors adapted to be attached to the lateral sides of automobile wind shields.

The primary object of our invention is to provide novel means of simple construction for mounting the deflecting members on the wind shield frame and so arranged that the deflecting members may be quickly and easily installed or removed from the frame or adjusted at any desired angle with respect to the wind shield.

In its preferred form our invention contemplates a supporting member positioned alongside the wind shield frame, means adapted to secure said member to the frame, and means adapted to adjustably mount the deflecting member on said supporting member, the means securing said supporting member to the frame comprising three clamping members having aligned apertures, the central and one of the outside members being provided with jaws adapted to grip said frame, the central and the other of said outside members being provided with jaws adapted to grip said supporting member, and a clamping bolt adapted to be inserted through said apertures, and the means adapted to mount the deflecting member on the supporting member comprising a pair of clamping members pivotally connected and having jaws adapted to frictionally engage the respective sides of said deflecting member, and a set screw adapted to cause said jaws to be brought into holding engagement with said deflecting member, one of said clamping members being adjustably associated with said supporting member whereby said deflecting member may be positioned at various angles with respect to the wind shield.

The invention consists in the novel constructions, arrangements and devices for carrying out the above stated object and such other objects as will appear from the following description of certain preferred embodiments thereof illustrated in the accompanying drawings in which—

Fig. 1 is a side elevation of an arrangement embodying the principles of our invention, certain parts being broken away;

Fig. 2 is a bottom plan view of the parts shown in Fig. 1;

Fig. 3 is a detail sectional view taken on the line 3—3 of Fig. 1;

Fig. 4 is a view similar to Fig. 3 illustrating a modification; and

Fig. 5 is an elevational view of a modified form of supporting rod adapted to fit certain special forms of wind shield frames.

Like characters of reference designate like parts in the several views.

Referring to the drawings, it will be seen that the deflecting member 10, which is preferably of plate glass, is mounted on a supporting rod 11 by means of clamping devices, designated as a whole by the reference character 12, the supporting rod being positioned alongside the lateral portion of the wind shield frame 13 and anchored thereto by means of a clamping device, designated as a whole by the reference character 14.

The clamping devices 12, 12 are of similar construction and each comprises a pair of clamping members 15 and 16 having jaws 17 provided with friction pads 18 adapted to bear against the opposing sides of the deflector member, the clamping members 15 and 16 being pivotally connected by means of a bolt 19 having a castellated nut 20 and a cotter pin 21 extending through the bolt transversely and engaging the nut 20 to prevent the same from working loose. To force the jaws 17 into effective holding engagement with the deflecting member a set-screw 22 is threaded through a rearwardly projecting lug 23 on the member 15 and bears against a rearwardly projecting lug 24 on the member 16. Each end of the rod 11 is reduced in diameter to provide a shoulder 25, the end of the rod projecting through an aperture 26 formed in the member 16 and threaded, the member 16 being clamped against the shoulder 25 by a castellated nut 27, said nut being held against turning movement by a cotter pin 28 projecting transversely through the rod. Preferably fiber washers 29 are interposed between the shoulder 25 and the member 16 and also between the nut 27 and said member to prevent relative movement of the member 16 on the rod 11.

The clamping device 14 comprises the clamping members 30, 31 and 32, each having an aperture for the insertion of a clamping bolt 33 and interlocking means 34 to hold said members in alignment. The members 30 and 31 have jaws adapted to grip the wind shield frame 13, and the members 31 and 32 have jaws adapted to grip the supporting rod 11, when the nut on the bolt 33 is tightened.

In the modified construction shown in Fig. 4 only two clamping members 35 and 36 are employed in connection with a clamping bolt 37, this bolt having an apertured head through which the supporting rod 11 projects, the rod 11 being clamped against the member 36 and the members 35 and 36 being clamped around the wind shield frame when the nut on the clamping bolt is tightened.

In Fig. 5 is shown a modified supporting rod provided with an off-set portion 11$^a$ which is adapted to fit certain special forms of windshields.

We claim;

1. In combination with a wind shield frame, a supporting rod, three clamping members interlockingly engaging each other and having aligned apertures, the central and one of the outside members having jaws adapted to grip said frame, the central and the other of said outside members having jaws adapted to grip said rod, a bolt inserted through said apertures, a deflecting member, a supporting member journaled on said rod and adapted to bear against one side of said deflecting member, and a second supporting member adjustably carried by said first mentioned supporting member and adapted to bear against the other side of said deflecting member, for the purpose specified.

2. In combination with a wind shield frame, a supporting rod, three clamping members interlockingly engaging each other and having aligned apertures, the central and one of the outside members having jaws adapted to grip said frame, the central and the other of said outside members having jaws adapted to grip said rod, a bolt inserted through said apertures, a deflecting member, and a pair of supporting devices, each of said devices comprising a supporting member journaled on said rod and adapted to bear against one side of said deflecting member, a second supporting member pivotally carried by said first mentioned supporting member and adapted to bear against the other side of said deflecting member, and means to maintain said supporting members in operative engagement with said deflecting member, for the purpose specified.

In testimony whereof, we affix our signatures.

CHARLES A. JOACHIM.
WILLIAM F. KILLIAN.